US00RE40771E

(19) United States
(12) Reissued Patent
Tanaka et al.

(10) Patent Number: US RE40,771 E
(45) Date of Reissued Patent: Jun. 23, 2009

(54) LIQUID CRYSTAL DISPLAY DEVICE AND METHOD OF DRIVING THE SAME

(75) Inventors: Shinya Tanaka, Matsuzaka (JP); Takayuki Shimada, Yamatokoriyama (JP); Takashi Ochi, Tenri (JP); Yuzuru Kanemori, Yamatokoriyama (JP); Mikio Katayama, Nara (JP)

(73) Assignee: Sharp Kabushiki Kaisha, Osaka (JP)

(21) Appl. No.: 09/773,870

(22) Filed: Feb. 2, 2001

Related U.S. Patent Documents

Reissue of:
(64) Patent No.: 5,867,139
Issued: Feb. 2, 1999
Appl. No.: 08/835,207
Filed: Apr. 7, 1997

(30) Foreign Application Priority Data

Apr. 22, 1996 (JP) ..... 8-100073

(51) Int. Cl.
*G09G 3/36* (2006.01)

(52) U.S. Cl. ..... 345/92; 345/87; 345/93; 345/96; 345/98

(58) Field of Classification Search ..... 345/87–104
See application file for complete search history.

(56) References Cited

U.S. PATENT DOCUMENTS

| | | | | | |
|---|---|---|---|---|---|
| 4,740,782 | A | * | 4/1988 | Aoki et al. | 345/92 |
| 5,285,301 | A | | 2/1994 | Shirahashi et al. | |
| 5,373,377 | A | * | 12/1994 | Ogawa et al. | 349/40 |
| 5,641,974 | A | * | 6/1997 | den Boer et al. | 257/59 |
| 5,682,211 | A | * | 10/1997 | Yao et al. | 349/38 |
| 5,867,139 | A | * | 2/1999 | Tanaka et al. | 345/92 |

FOREIGN PATENT DOCUMENTS

| | | | |
|---|---|---|---|
| JP | 63-210823 | A | 9/1988 |
| JP | 1-197722 | A | 8/1989 |
| JP | 2-157826 | A | 6/1990 |
| JP | 7-84223 | A | 3/1995 |
| JP | 8-43793 | A | 2/1996 |

OTHER PUBLICATIONS

First Preliminary Pleading by Obligor in Tokyo District Court Civil 46$^{th}$ Section, Creditor: Sharp Kabushiki Kaisha; Obligor: Iyama Co., Ltd., Sep. 24, 2002 and translation thereof.

(Continued)

*Primary Examiner*—Vijay Shankar
(74) *Attorney, Agent, or Firm*—Nixon & Vanderhye, P.C.

(57) ABSTRACT

A liquid crystal display device is formed by arranging a plurality of scanning lines $\mathbf{3}_1$, $\mathbf{3}_2$, . . . to which scanning signals are successively applied and a plurality of signal lines $\mathbf{4}_1$, $\mathbf{4}_2$, . . . to which data signals are successively applied to intersect at right angles. Mounted in the vicinity of each of the intersections of the scanning lines $\mathbf{3}_1$, $\mathbf{3}_2$, . . . and signals lines $\mathbf{4}_1$, $\mathbf{4}_2$, . . . are a TFT 5 electrically connected to both of the lines, and a pixel electrode 6 connected to the TFT 5. A common electrode is placed to face the pixel electrode 6 with liquid crystals 2 therebetween. One of electrodes of a pixel capacitance formed by the pixel electrode 6 is connected to a common line 9 for supplying a common signal to the common electrode 7. A dummy scanning line $\mathbf{3}_0$ for forming a capacitance is arranged outside of the scanning line $\mathbf{3}_1$ located at the outermost position on a scanning start side of scanning signal. In this structure, since an equal parasitic capacitance is generated in the pixels irrespectively of their positions, it is possible to eliminate defects, such as deterioration of display quality due to an appearance of a bright line in particular pixels.

27 Claims, 8 Drawing Sheets

OTHER PUBLICATIONS

Otu Document 16, In Tokyo District Court, Civil 46$^{th}$ Section, Second Copy, Aug. 26, 2002 and translation thereof.

Second Pleading by Defendants in Tokyo District Court Civil 46$^{th}$ Section, Claimant: Sharp Kabushiki Kaisha; Defendants: Iyama Co., Ltd. and one other, Dec. 13, 2002.

Defendants' Reference 36 in Tokyo District Court Civil 46$^{th}$ Section, Dec. 5, 2002.

Defendants' Reference 37 in Tokyo District Court 46$^{th}$ Section, Dec. 5, 2002 (Product Analysis Report).

English Translation of Second Pleading by Defendants in Tokyo District Court Civil 46$^{th}$ Section, Claimant: Sharp Kabushiki Kaisha; Defendants: Iyama Co., Ltd. and one other, Dec. 13, 2002.

English Translation of Defendants' Reference 36 in Tokyo District Court Civil 46$^{th}$ Section, Dec. 5, 2002.

* cited by examiner

LIQUID CRYSTAL DISPLAY DEVICE AND METHOD OF DRIVING THE SAME

Matter enclosed in heavy brackets [ ] appears in the original patent but forms no part of this reissue specification; matter printed in italics indicates the additions made by reissue.

FIELD OF THE INVENTION

The present invention relates to an active matrix type liquid crystal display device having switching elements, such as thin film transistors, arranged in a matrix pattern, and a method of driving the liquid crystal display device.

BACKGROUND OF THE INVENTION

As illustrated in FIG. 10, an active liquid crystal display device is constructed by sealing liquid crystals 2 in the space between a pair of upper and lower transparent glass substrates 1b and 1a.

As shown in FIG. 9, formed on the lower substrate 1a are scanning lines $\mathbf{3}_1$, $\mathbf{3}_2$ . . . , and signal lines $\mathbf{4}_1$, $\mathbf{4}_2$ . . . intersecting the scanning lines $\mathbf{3}_1$, $\mathbf{3}_2$ . . . at right angles. The scanning lines $\mathbf{3}_1$, $\mathbf{3}_2$ . . . are formed by a conducting film, and scanning signals from a scanning drive circuit K are successively applied to the scanning lines $\mathbf{3}_1$, $\mathbf{3}_2$ . . . On the other hand, the signal lines $\mathbf{4}_1$, $\mathbf{4}_2$ . . . are formed by a conducting film, and data signals from a data drive circuit L are successively applied to the signal lines $\mathbf{4}_1$, $\mathbf{4}_2$ . . .

Mounted in the vicinity of each of the intersections of the scanning lines $\mathbf{3}_1$, $\mathbf{3}_2$ . . . and the signal lines $\mathbf{4}_1$, $\mathbf{4}_2$ . . . are a thin film transistor (TFT) 5 as a switching element, and a pixel electrode 6 formed by a conducting film. The TFT 5 is electrically connected to both of the lines, and the pixel electrode 6 is connected to the TFT 5.

As shown in FIG. 10, a common electrode 7 and a color filter 8 are mounted on the upper glass substrate 1b. The common electrode 7 is formed by a transparent conducting film and connected to a common line 9 to which a common signal is applied. The pixel electrode 6 and the common electrode 7 form a capacitor 12 for ensuring a liquid crystal capacitance $C_{LC}$ as shown in FIG. 11.

As illustrated in FIG. 9, in the TFT 5, a gate electrode 5g is connected to each of the scanning lines $\mathbf{3}_1$, $\mathbf{3}_2$ . . . , a source electrode 5s is connected to each of the signal lines $\mathbf{4}_1$, $\mathbf{4}_2$ . . . , and a drain electrode 5d is connected to the pixel electrode 6.

Moreover, an additional capacitance line 10 formed by a conducting film is arranged below the pixel electrode 6, and connected to the common line 9. Considering an improvement of the data retentivity of the liquid crystals 2 to achieve high image quality, a capacitor 13 for ensuring an additional capacitance Cs is formed by the pixel electrode 6 and the additional capacitance line 10 as shown in FIG. 11.

In the liquid crystal display device of the above-mentioned structure, for example, when scanning signals are successively input downward from the scanning drive circuit K to the scanning lines $\mathbf{3}_1$, $\mathbf{3}_2$ . . . , the gates of a line of the TFTs 5 are simultaneously turned ON by the input of the scanning signals, and a display-use data signal is input for each pixel from the signal lines $\mathbf{4}_1$, $\mathbf{4}_2$ . . . by the data drive circuit L. As a result, the data signal is applied to the pixel electrode 6, and the transmittance of the liquid crystals 2 is changed by the potential difference between the pixel electrode 6 and the common electrode 7.

In this case, when a direct current continues to be supplied over a long time, the data retentivity of the liquid crystals 2 deteriorate. Therefore, the liquid crystals 2 are driven by a so-called AC drive method in which a positive voltage and a negative voltage are alternately applied to the pixel electrode 6 by switching the polarity of data signals to be input to the signal lines $\mathbf{4}_1$, $\mathbf{4}_2$ . . . for example, every horizontal period.

As the ideal capacitance (pixel capacitance) for a single pixel, in general, only the liquid crystal capacitance $C_{LC}$ and the additional capacitance Cs exist between the pixel electrode 6 and the common electrode 7 and between the pixel electrode 6 and the additional capacitance line 10, respectively, as shown in FIG. 11.

Actually, when conducting films are placed parallel to each other or conducting films are placed one upon another with an insulating film therebetween, a parasitic capacitance is generated between the conducting films. For example, as shown in FIG. 15, in a pixel located in the second row and the first column, i.e., a pixel in which the gate of the TFT 5 is connected to the second scanning line from the top, $\mathbf{3}_2$, and the source thereof is connected to the first signal line from the left, $\mathbf{4}_1$, the periphery of the pixel electrode 6 is enclosed by the upper and lower scanning lines $\mathbf{3}_1$ and $\mathbf{3}_2$, and the right and left signal lines $\mathbf{4}_1$ and $\mathbf{4}_2$ as shown in FIG. 9. Therefore, as illustrated in FIG. 12, parasitic capacitances $Cgd_2$, $Cgd_1$, $Csd_2$ and $Csd_1$ are generated between the pixel electrode 6 and the lines $\mathbf{3}_1$, $\mathbf{3}_2$, $\mathbf{4}_1$, $\mathbf{4}_2$, respectively.

The parasitic capacitance ratio in this pixel is given by $$\alpha=\Delta C/(C_{LC}+Cs+\Delta C) \quad (1)$$

where $\Delta C=Cgd_1+Cgd_2$.

When driving the liquid crystals 2 by the above-mentioned AC drive method, such a parasitic capacitance ratio $\alpha$ affects the fluctuation $\Delta V$ of a voltage applied to the pixel electrode 6, and the voltage fluctuation $\Delta V$ generates a DC component, resulting in deterioration of the data retentivity. In order to prevent the generation of the DC component, in prior arts, optimization is performed for each gray scale according to the parasitic capacitance ratio $\alpha$.

The above explanation of the parasitic capacitance generated in each pixel is given for a pixel whose TFT 5 is connected to the scanning line $\mathbf{3}_2$ located in the second row from the top.

Next, with reference to a pixel whose TFT 5 is connected to the topmost scanning line $\mathbf{3}_1$ from which the scanning of scanning signal is initiated, the following description will explain a parasitic capacitance generated in this pixel. Since no scanning line is present above the pixel electrode 6 constituting this pixel, the parasitic capacitance $Cgd_2$ is not generated.

Therefore, in this case, the parasitic capacitance ratio is given by $$\alpha'=\Delta C/(C_{LC}+Cs+\Delta C') \quad (2)$$

where $\Delta C'=Cgd_1$.

Namely, the parasitic capacitance ratio in the pixels corresponding the scanning lines $\mathbf{3}_2$, $\mathbf{3}_3$ . . . other than topmost scanning line $\mathbf{3}_1$ becomes the parasitic capacitance ratio $\alpha$ given by Equation (1) because these scanning lines are all symmetrically arranged about the additional capacitance line 10 as shown in FIG. 9. However, since the topmost scanning line $\mathbf{3}_1$ is not symmetrical about the additional capacitance line 10, the parasitic capacitance ratio in the pixels corresponding to the topmost scanning lines $\mathbf{3}_1$ becomes the parasitic capacitance $\alpha'$ given by Equation (2).

Thus, the parasitic capacitance ratio in the pixels corresponding to the topmost scanning line $\mathbf{3}_1$ differs from the parasitic capacitance ratio in the pixels corresponding to the scanning lines $\mathbf{3}_2$, $\mathbf{3}_3$ . . . located after the first row.

As described above, optimization is performed for the pixels corresponding to the scanning lines $3_2$, $3_3$ . . . after the first row so as to reduce the influence of the parasitic capacitance ratio $\alpha$ and prevent the application of a DC component to the liquid crystals 2.

However, since the parasitic capacitance ratio $\alpha'$ in the pixels corresponding to the topmost scanning line $3_1$ differs from the parasitic capacitance ratio in the pixels corresponding to other scanning lines, the fluctuation $\Delta V$ of the voltage to be applied to the pixel electrodes 6 cannot be eliminated. As a result, an extremely small DC component is applied to the liquid crystals 2 in the pixels corresponding to the first scanning line $3_1$, and therefore the data retentivity of the liquid crystals 2 deteriorate with time.

Consequently, a line of pixels corresponding to the topmost scanning lines $3_1$ may cause a defect, for example, a bright line, deteriorating the display quality. In this case, for example, if the liquid crystals 2 are of normally white type, a bright line appears in the halftone display. On the other hand, if the liquid crystals 2 are of normally black type, a black line appears in the halftone display. Such a phenomenon is particularly noticeable when a current is supplied under high temperatures.

SUMMARY OF THE INVENTION

It is an object of the present invention to provide a liquid crystal display device and a drive method thereof, capable of preventing defects such as the deterioration of display quality due to the appearance of particular pixels as a bright line by ensuring an equal parasitic capacitance for pixels of any location.

In order to achieve the above object, a liquid crystal display device of the present invention includes:

- a pair of substrates sandwiching liquid crystals therebetween;
- a plurality of scanning lines to which scanning signals are successively applied;
- a plurality of signal lines to which data signals are successively applied, the signal lines intersecting the scanning lines at right angles;
- a switching element which is arranged in the vicinity of each of the intersections of the scanning lines and the signal lines, and electrically connected to both of the scanning and signal lines;
- a pixel electrode connected to each of the switching elements;
- the scanning lines, signal lines, switching elements and pixel electrodes being formed on one of the substrates,
- a common electrode formed on the other of the substrates so that the common electrode faces the pixel electrode with the liquid crystals therebetween;
- a common line for supplying a common signal to the common electrode;
- a pixel capacitance, one of electrodes of the pixel capacitance formed by the pixel electrode being connected to the common line; and
- a dummy scanning line formed outside of one of the scanning lines located at an outermost position on either a scanning start side or a scanning end side of scanning signal.

In this liquid crystal display device, an equal parasitic capacitance is formed in any pixels irrespectively of their positions by providing the dummy scanning line. This structure reduces conventional defects caused by unequal parasitic capacitances in the respective pixels, i.e., defects such as the deterioration of display quality due to the appearance of particular pixels as a bright line.

For a fuller understanding of the nature and advantages of the invention, reference should be made to the ensuing detailed description taken in conjunction with the accompanying drawings.

DESCRIPTION OF THE PREFERRED EMBODIMENTS

[Embodiment 1]

The following description will discuss one embodiment of the present invention.

In this embodiment, an active matrix type liquid crystal display device will be explained as a liquid crystal display device. The display mode of the liquid crystal display device is a super video graphics array (SVGA) mode. The same can be said for embodiments discussed later.

Figure 1:
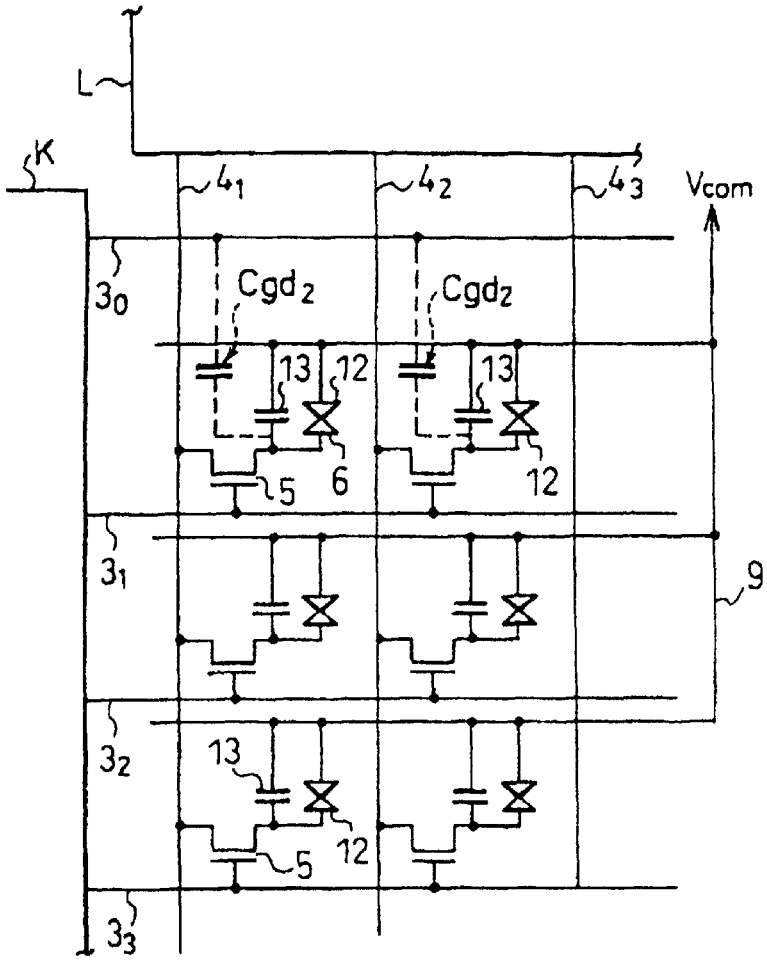
FIG. 1 is a circuit diagram showing the structure of a liquid crystal display device according to Embodiment 1 of the present invention.

As illustrated in FIG. 1, the liquid crystal display device includes scanning lines $3_1$, $3_2$, . . . and signal lines $4_1$, $4_2$, . . .

intersecting the scanning lines $3_1$, $3_2$, . . . at right angles. The scanning lines $3_1$, $3_2$, . . . are formed by a conducting film. Scanning signals from a scanning signal drive circuit K are successively applied to the scanning lines $3_1$, $3_2$, . . . On the other hand, the signal lines $4_1$, $4_2$, . . . are formed by a conducting film. Data signals from a data drive circuit L are successively applied to the signal lines $4_1$, $4_2$, . . .

Disposed in the vicinity of the intersections of the scanning lines $3_1$, $3_2$, . . . and signal lines $4_1$, $4_2$, . . . are thin film transistors (TFTs) 5 as switching elements which are electrically connected to both of the lines, and pixel electrodes 6 which are formed by a conducting film and connected to the TFTs 5.

A dummy scanning line $3_0$ for producing a capacitance is arranged outside of the scanning lines $3_1$, $3_2$, . . . i.e., outside of the outermost scanning line $3_1$ arranged at a scanning start position from which the scanning of scanning signal starts. The dummy scanning line $3_0$ is parallel to and faces the scanning line $3_1$ with the pixel electrode 6 connected to the TFT 5 connected to the scanning line $3_1$ therebetween.

More specifically, the dummy scanning line $3_0$ is arranged at the same pitch as the pitch of other adjacent scanning lines, for example, $3_1$ and $3_2$, so that the pixel electrode 6 is located between the dummy scanning line $3_0$ and the scanning line $3_1$. The dummy scanning line $3_0$ will be explained in detail later.

Figure 9:
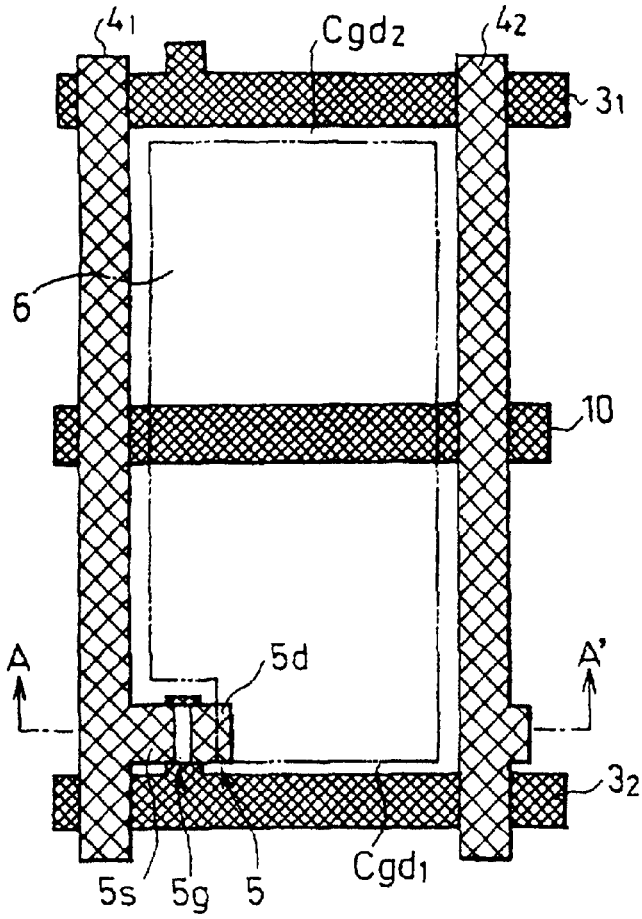
FIG. 9 is a plane view showing the structure of a single pixel on a display panel of an active matrix type liquid crystal display device.
Figure 10:
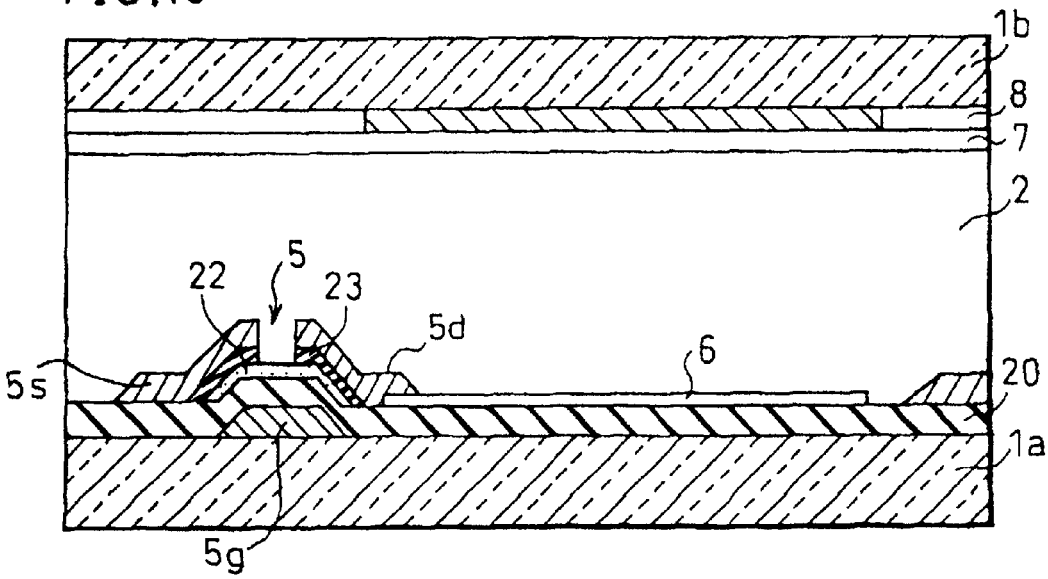
FIG. 10 is a cross sectional view of FIG. 9 cut across the A—A' line.

The pixel electrode 6 is formed by a transparent conducting film, aluminum, etc. For example, as illustrated in FIG. 9, an additional capacitance line 10 formed by a conducting film is arranged below the pixel electrode 6. A common line 9 is connected to the additional capacitance line 10. FIG. 10 is a cross sectional view showing the vicinity of the junction of the pixel electrode 6 and the TFT 5.

As illustrated in FIG. 10, the above-mentioned liquid crystal display device is constructed by sealing in liquid crystals 2 between a pair of upper and lower transparent glass substrates 1b and 1a.

Formed on the lower glass substrate 1a are a gate electrode 5g of the TFT 5, and a gate insulating film 20 covering the gate electrode 5g.

An i layer 22 and an $n^+$ layer 23 are successively formed by amorphous Si on the gate insulating film 20 at the position corresponding to the gate electrode 5g. Formed on the $n^+$ layer 23 of amorphous Si are a source electrode 5s and a drain electrode 5d of the TFT 5. The pixel electrode 6 is formed in a pixel region on the gate insulating film 20. The pixel electrode 6 is connected to the drain electrode 5d.

Namely, in the TFTs 5, the gate electrodes 5g are connected to the scanning lines $3_1$, $3_2$, . . . , the source electrodes 5s are connected to the signal lines $4_1$, $4_2$, . . . , and the drain electrodes 5d are connected to the pixel electrodes 6.

On the other hand, a color filter 8 and a common electrode 7 are successively formed on the upper glass substrate 1b. The common line 9 (FIG. 1) to which a common signal is applied is connected to the common electrode 7. The color filter 8 is made of three primary colors, red, green and blue, and placed in a position corresponding to each pixel electrode 6.

An alignment film (not shown) for aligning the liquid crystals 2 is formed to cover the pixel electrode 6. Similarly, on the upper glass substrate 1b, an alignment film (not shown) is formed to cover the common electrode 7.

Further, a polarizing plate (not shown) is mounted on outer surfaces of the glass substrates 1a and 1b, i.e., surfaces which do not come into contact with the liquid crystals 2.

Figure 11:
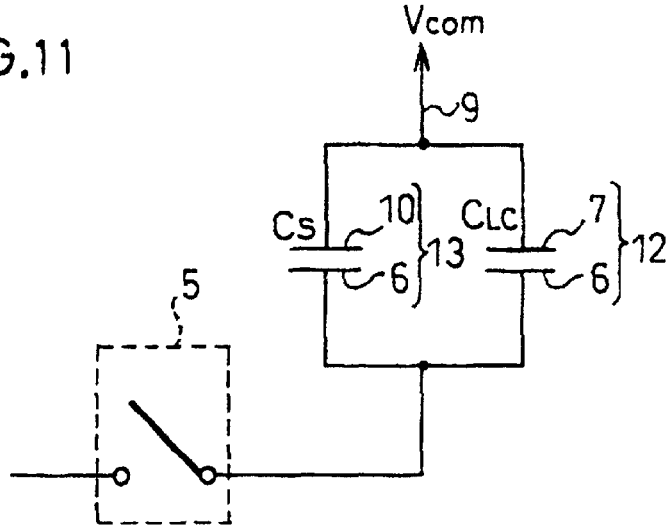
FIG. 11 is a diagram of an equivalent circuit of a capacitance which is generated in an ideal state in the single pixel shown in FIG. 9.

Capacitors 12 and 13 as pixel capacitances are formed by the pixel electrode 6, and the opposite common electrode 7 and additional capacitance line 10, respectively. More specifically, as illustrated in FIG. 11, the capacitor 12 is formed by the pixel electrode 6 and the common electrode 7 to ensure a liquid crystal capacitance $C_{LC}$. In order to achieve high image quality by improving the data retentivity of the liquid crystals 2, the capacitor 13 is formed by the pixel electrode 6 and the additional capacitance 10 to ensure an additional capacitance Cs.

In the liquid crystal display device of the above-mentioned structure, when scanning signals are successively input downward from the scanning drive circuit K to the scanning lines $3_1$, $3_2$, . . . , the gates of a line of the TFTs 5 are simultaneously turned on, and display-use data signals are input to the signal lines $4_1$, $4_2$, . . . for each pixel by the data drive circuit L. As a result, the data signals are input to the pixel electrodes 6, and the transmittance of the liquid crystals 2 is varied by the potential difference between the pixel electrodes 6 and the common electrodes 7.

In this case, when a direct current continues to be supplied over a long time, the data retentivity of the liquid crystals 2 deteriorates. Therefore, the liquid crystals 2 are driven by a so-called AC drive method in which a positive voltage and a negative voltage are alternately applied to the pixel electrode 6 by switching the polarity of the data signals to be input to the signal lines $4_1$, $4_2$, . . . , for example, every horizontal scanning period.

In general, as an ideal capacitance (pixel capacitance) of a single pixel, only the liquid crystal capacitance $C_{LC}$ and the additional capacitance $C_S$ exist between the pixel electrode 6 and the common electrode 7 and between the pixel electrode 6 and the additional capacitance line 10, respectively, as shown in FIG. 11.

However, in actual fact, when conducting films are arranged parallel to each other, or the conducting films are placed one upon another with an insulating film therebetween, a parasitic capacitance is generated between the conducting films.

Figure 12:
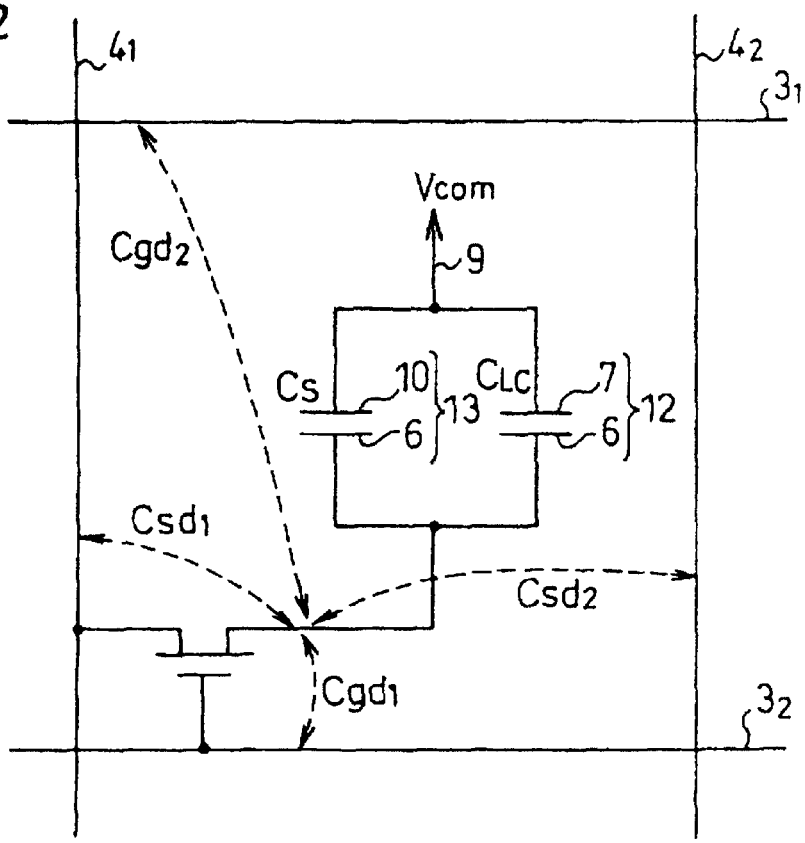
FIG. 12 is a diagram of an equivalent circuit of a capacitance which is generated in an actual state in the single pixel shown in FIG. 9.

Therefore, for example, in a pixel located in the second row and the first column, i.e., a pixel in which the gate electrode 5g of the TFT 5 is connected to the second scanning line from the top, $3_2$, and the source electrode 5s is connected to the first signal line from the left, $4_1$, the periphery of the pixel electrode 6 is enclosed by the upper and lower scanning lines $3_1$ and $3_2$, and the left and right signal lines $4_1$ and $4_2$ as shown in FIG. 9. Thus, in this pixel, as shown in FIG. 12, parasitic capacitances $Cgd_2$, $Cgd_1$, $Csd_2$, and $Csd_1$ are generated between the pixel electrode 6 and the lines $3_1$, $3_2$, $4_1$, and $4_2$, respectively, as well as the liquid crystal capacitance $C_{LC}$ and the additional capacitance Cs.

The parasitic capacitance ratio in this pixel is given by $$\alpha=\Delta C/(C_{LC}+Cs+\Delta C) \quad (1)$$

where $\Delta C=Cgd_1+Cgd_2$.

When driving the liquid crystals 2 by the above-mentioned AC drive method, the parasitic capacitance ratio $\alpha$ affects a fluctuation $\Delta V$ of a voltage applied to the pixel electrode 6, and the voltage fluctuation $\Delta V$ produces a DC component and deteriorates the data retentivity. Therefore, optimization is performed for each gray scale according to the parasitic capacitance ratio $\alpha$ so as to prevent the generation of the DC component.

Next, with reference to a pixel in which the gate electrode 5g of the TFT 5 is connected to the topmost scanning line, $3_1$, shown in FIG. 1 from which the scanning of scanning signal starts and the source electrode 5s is connected to the first signal line, $\mathbf{4}_1$, from the left, a parasitic capacitance ratio α' in this pixel will be discussed.

Since the dummy scanning line $\mathbf{3}_0$ is arranged above the pixel electrode 6 constituting this pixel at the same pitch as the pitch of other adjacent scanning lines, for example, $\mathbf{3}_1$ and $\mathbf{3}_2$ so that the pixel electrode 6 is located between the dummy scanning line $\mathbf{3}_0$ and the scanning line $\mathbf{3}_1$, $Ggd_2$ is generated between the pixel electrode 6 and the dummy electrode $\mathbf{3}_0$ in the same manner as the above-mentioned parasitic capacitance generated between the pixel electrode 6 and the scanning line $\mathbf{3}_1$.

Thus, the parasitic capacitance ratio in this pixel is given by $$\alpha'=\Delta C'/(C_{LC}+Cs+\Delta C') \quad (2)$$

where $\Delta C'=Cgd_1+Cgd_2=\Delta C$.

Therefore, $\alpha'=\Delta C/(C_{LC}+Cs+\Delta C)=\alpha$.

Namely, the pixel electrode 6 connected to the TFT 5 connected to the topmost scanning line $\mathbf{3}_1$ is sandwiched between the dummy scanning line $\mathbf{3}_0$ above and the scanning line $\mathbf{3}_1$ below. As a result, since all of the pixels are geometrically symmetrical about the additional capacitance line 10 as shown in FIG. 9, the parasitic capacitance ratio in all of the pixels becomes α given by Equation (1) above, thereby preventing different parasitic capacitance ratios which are seen in a conventional structure.

Figure 2:
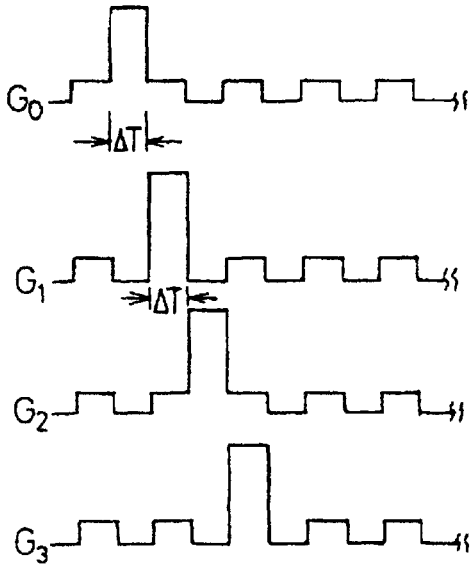
FIG. 2 is a timing chart for inputting signals to a dummy scanning line and scanning lines in the liquid crystal display device shown in FIG. 1.

Moreover, in this embodiment, a scanning signal $G_0$ having the same waveform and the same time difference ΔT as normal scanning signals $G_1$, $G_2$, $G_3$, . . . to be input to the scanning lines $\mathbf{3}_1$, $\mathbf{3}_2$, . . . , by the scanning drive circuit K is newly generated as shown in FIG. 2. The scanning signal $G_0$ is applied to the dummy scanning line $\mathbf{3}_0$ before an output of the scanning signal $G_1$ to be applied to the topmost scanning line $\mathbf{3}_1$. Hence, a part of the scanning drive circuit K forms signal input means for inputting a signal to the dummy scanning line $\mathbf{3}_0$.

Thus, by performing optimization in advance according to the parasitic capacitance ratio α, the pixel driven by the topmost scanning line $\mathbf{3}_1$ has completely the same conditions as the pixels driven by other scanning lines $\mathbf{3}_2$, $\mathbf{3}_3$, . . . Therefore, in the case of a normally white display, it is possible to completely eliminate such a conventional phenomenon that a line of pixels in the topmost row appears as a bright line.

It is arranged in this embodiment that the scanning of scanning signal starts from the topmost scanning line $\mathbf{3}_1$. However, if the scanning of scanning signal is arranged to start from the lowest scanning line, 3i, the topmost scanning line $\mathbf{3}_1$ becomes the outermost scanning line on the scanning end side of scanning signal. Thus, the dummy scanning line $\mathbf{3}_0$ can be formed at the outermost position on either the scanning start side or the scanning end side of scanning signal.

The following description will discuss the rate of occurrence of bright line in the liquid crystal display device of the above-mentioned structure.

Figure 8:
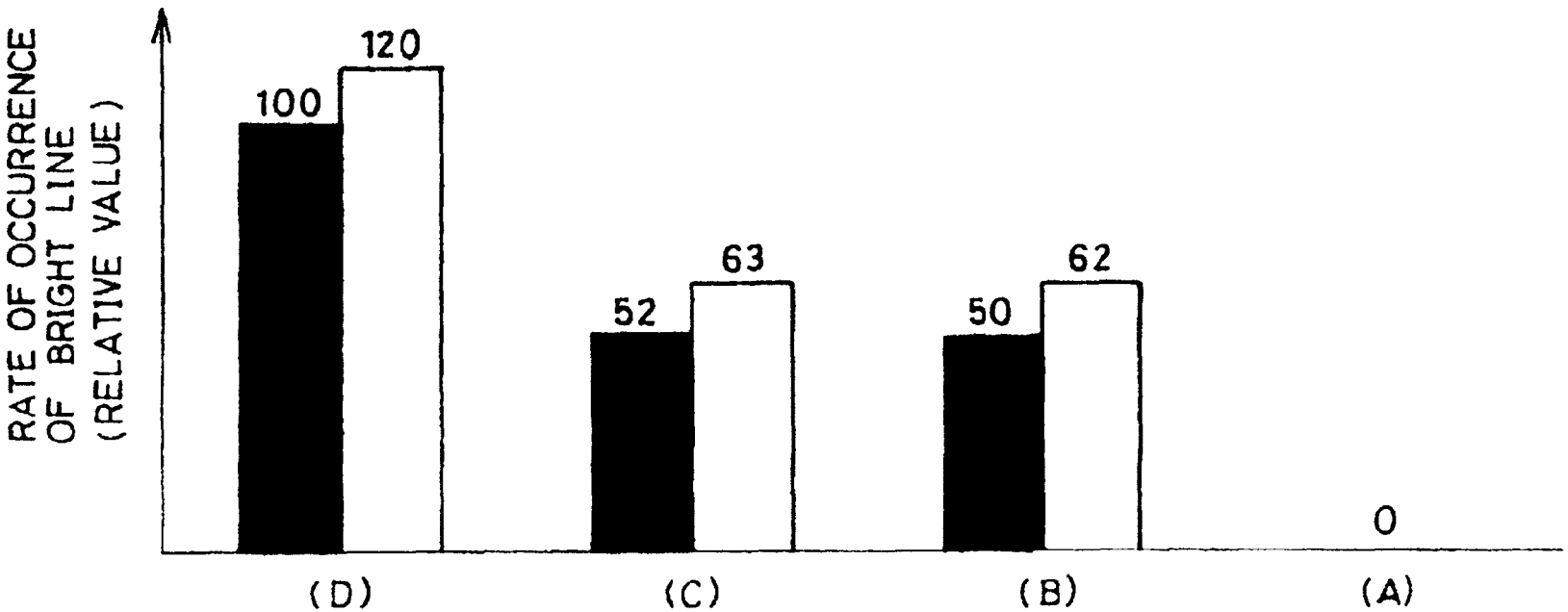
FIG. 8 is a graph showing results of examination of the occurrence of a blanking line in the respective embodiments.

With respect to the halftone display of a line of pixels corresponding to the topmost scanning line $\mathbf{3}_1$, the rate of occurrence of bright line (relative value) was measured after continuously supplying a current under a temperature of 60° C. for 6 hours and 240 hours. In FIG. 8, the block bar graph represents the rate of occurrence of bright line measured when 6 hours elapsed, while the white bar graph shows the value measured when 240 hours elapsed.

In this case, the rate of occurrence of bright line measured when six hours elapsed after successively inputting scanning signals $G_1$, $G_2$, . . . to the scanning lines $\mathbf{3}_1$, $\mathbf{3}_2$, . . . without inputting any signal to the dummy scanning line $\mathbf{3}_0$, was indicated as a reference value, 100.

In FIG. 8, (A) indicates the result obtained when the scanning signal $G_0$ inherent in the dummy scanning line $\mathbf{3}_0$ was input. (D) shows the result obtained when no signal was input to the dummy scanning line $\mathbf{3}_0$.

It was found from these results that, when the scanning signal $G_0$ shown in FIG. 2 was input to the dummy scanning line $\mathbf{3}_0$, such a phenomenon that only the topmost line appears as a bright line did not occur at all on the contrary to the case in which any signal was not input to the dummy scanning line $\mathbf{3}_0$.

However, when the dummy scanning line $\mathbf{3}_0$ is not provided though this structure is not shown in FIG. 8, since the parasitic capacitance ratio certainly varies, the rate of occurrence of bright line becomes much higher than that in the above-mentioned case, (D), in which the dummy scanning line $\mathbf{3}_0$ is just provided. It was thus found that, even if a signal is not input to the dummy scanning line $\mathbf{3}_0$, the rate of occurrence of bright line can be lowered to some degrees by just providing the dummy scanning line $\mathbf{3}_0$.

[Embodiment 2]

The following description will discuss another embodiment of the present invention. The members having the same function as in Embodiment 1 above will be designated by the same code and their description will be omitted.

Figure 3:
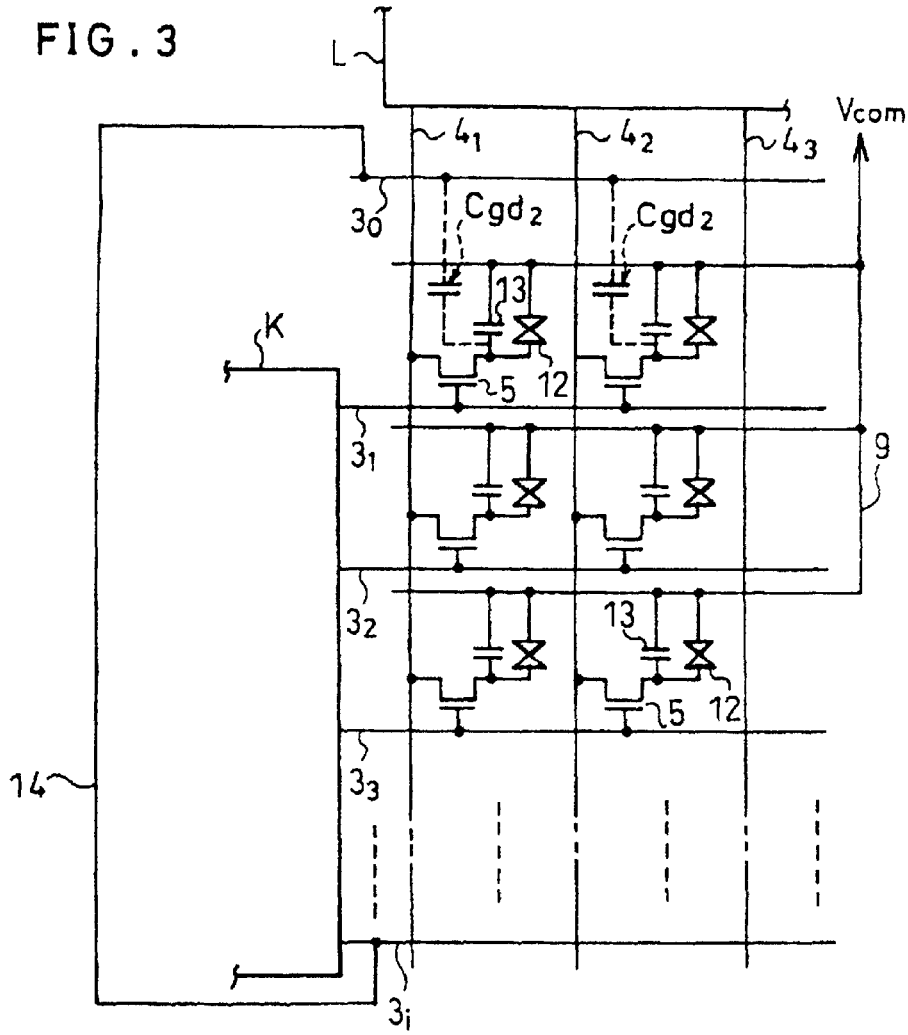
FIG. 3 is a circuit diagram showing the structure of a liquid crystal display device according to Embodiment 2 of the present invention.

Like Embodiment 1, in a liquid crystal display device of this embodiment, as shown in FIG. 3, the dummy scanning line $\mathbf{3}_0$ for forming a capacitance is arranged outside of the topmost scanning line, $\mathbf{3}_1$ on the scanning start side of scanning signal so that the pixel electrode 6 connected to the TFT 5 connected to the scanning line $\mathbf{3}_1$ is located between the dummy scanning line $\mathbf{3}_0$ and the scanning line $\mathbf{3}_1$.

Figure 4:
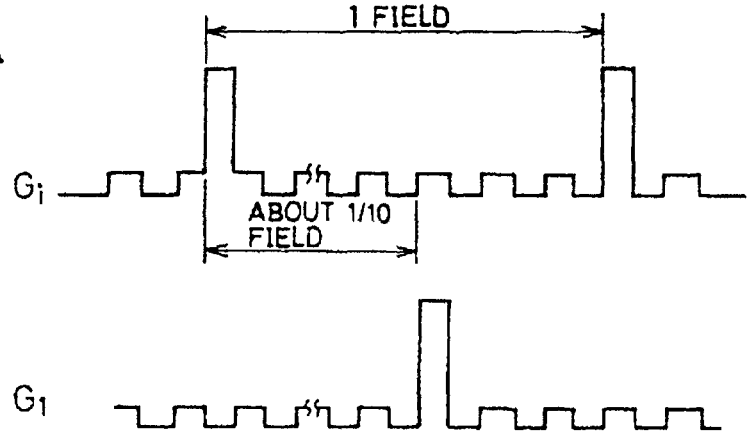
FIG. 4 is a timing chart for inputting signals to a dummy scanning line and scanning lines in the liquid crystal display device shown in FIG. 3.

However, in this embodiment, unlike Embodiment 1 above, the dummy scanning line $\mathbf{3}_0$ is connected to the lowest scanning line, 3i, through a coupling line 14. As a result, as shown in FIG. 4, a scanning signal Gi output to the lowest scanning line 3i from the scanning drive circuit K is directly input to the dummy scanning line $\mathbf{3}_0$ through the coupling line 14.

In this case, since the scanning signal $G_0$ input to the dummy scanning line $\mathbf{3}_0$ is the scanning signal Gi output to the scanning line 3i, the scanning signal $G_0$ certainly has the same waveform and the same time difference ΔT as the normal scanning signals $G_1$, $G_2$, $G_3$, . . . input to the scanning lines $\mathbf{3}_1$, $\mathbf{3}_2$, . . . by the scanning drive circuit K. Consequently, there is no need to newly generate the scanning signal $G_0$ to be input to the dummy scanning line $\mathbf{3}_0$. Namely, the scanning drive circuit K functions as the signal input means for inputting a signal to the dummy scanning line $\mathbf{3}_0$.

Therefore, in this structure, unlike Embodiment 1, the existent scanning signal Gi can be used without newly generating the scanning signal $G_0$ inherent in the dummy scanning line $\mathbf{3}_0$ by changing a part of the scanning drive circuit K. Moreover, since the time difference between the output of the scanning signal Gi and the output of the scanning signal $G_1$ to be applied to the topmost scanning line $\mathbf{3}_1$ is the smallest, the pixels driven by the topmost scanning line $\mathbf{3}_1$ have substantially the same conditions as the pixels driven by other scanning lines $\mathbf{3}_2$, $\mathbf{3}_3$, . . . , thereby reducing defects, such as the phenomenon in which a line of pixels appear as a bright line, to a sufficient level.

Thus, when the scanning signal Gi to be applied to the lowest scanning line 3i is input to the dummy scanning line $3_0$, as shown in (A) of FIG. 8, the rate of occurrence of bright line becomes zero. This means that the phenomenon in which only the topmost line appears as a bright line is completely eliminated.

However, in this embodiment, since the display mode of the liquid crystal display device is the SVGA mode, the vertical blanking period is about 10% of one field. Therefore, the output of a scanning signal to each scanning line is shifted from each other by about one tenth of a field as shown in FIG. 4.

[Embodiment 3]

The following description will discuss still another embodiment of the present invention. The members having the same function as in Embodiment 1 will be designated by the same code and their description will be omitted.

Figure 5:
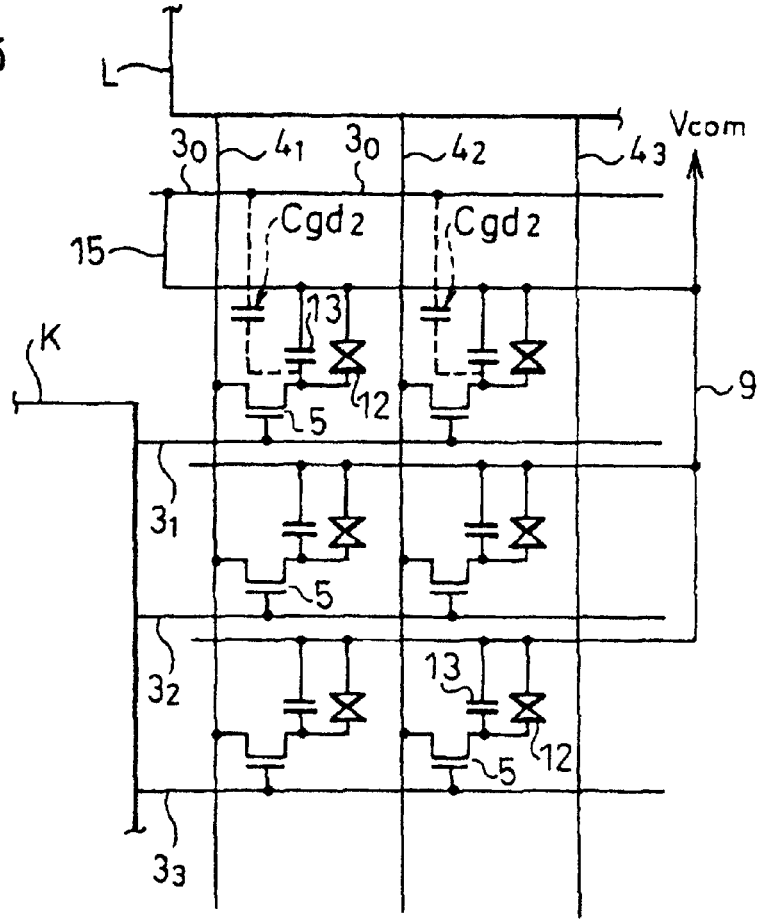
FIG. 5 is a circuit diagram showing the structure of a liquid crystal display device according to Embodiment 3 of the present invention.

Like Embodiment 1 above, in a liquid crystal display device of this embodiment, as shown in FIG. 5, the dummy scanning line $3_0$ for forming a capacitance is arranged outside of the topmost scanning line, $3_1$, on the scanning start side of scanning signal so that the pixel electrode 6 connected to the TFT 5 connected to the scanning line $3_1$ is placed between the dummy scanning line $3_0$ and the scanning line $3_1$.

Figure 6:
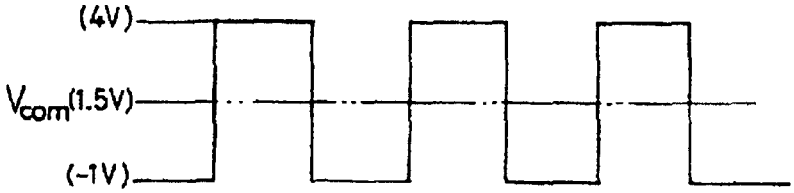
FIG. 6 is a timing chart for inputting common signals to a dummy scanning line in the liquid crystal display device shown in FIG. 5.

However, in this embodiment, unlike Embodiment 1, the dummy scanning line $3_0$ is connected to the common line 9 through a coupling line 15. As a result, as shown in FIG. 6, a common signal $V_{com}$ to be applied to the common line 9 is directly input to the dummy scanning line $3_0$ through the coupling line 15. Namely, means for generating the common signal $V_{com}$ functions as the signal input means for inputting a signal to the dummy scanning line $3_0$.

More specifically, since the common signal $V_{com}$ which switches its level every horizontal scanning period (1H) is input through the common line 9 to the common electrode 7 and the additional capacitance line 10 in order to drive the liquid crystals 2 by the AC drive method, the common signal $V_{com}$ is simultaneously input to the scanning lines and the dummy scanning line $3_0$.

Therefore, in this structure, the existent common signal $V_{com}$ can be used without newly generating the scanning signal $G_0$ inherent in the dummy scanning line $3_0$ by changing a part of the scanning drive circuit K like Embodiment 1.

Moreover, the rate of occurrence of bright line when the common signal $V_{com}$ (see FIG. 6) was input to the dummy scanning line $3_0$ is the one shown in (C) of FIG. 8. It was found from this result that, when the common signal $V_{com}$ is input to the dummy scanning line $3_0$, the rate of occurrence of bright line can be reduced to about a half of the rate (shown in (D) of FIG. 8) measured when any signal was not input to the dummy scanning line $3_0$.

[Embodiment 4]

The following description will discuss yet another embodiment of the present invention. In this embodiment, a liquid crystal display device having the same circuit structure as in Embodiment 1 is used.

Figure 7:
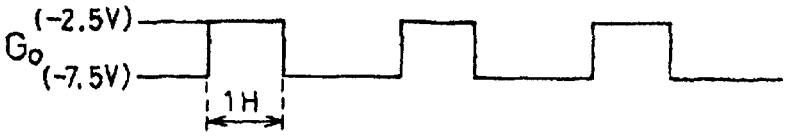
FIG. 7 is a timing chart for inputting signals to a dummy scanning line in the liquid crystal display device shown in FIG. 1 according to another example.

In this embodiment, as shown in FIG. 7, the scanning signal $G_0$ of a low level that cannot turn on the TFT 5, for example, in a range of −7.5 V to −2.5 V, is input to the dummy scanning line $3_0$. This low level scanning signal $G_0$ is generated in the scanning drive circuit K. Namely, means for inputting a signal to the TFT 5 functions as the signal input means for inputting a signal to the dummy scanning line $3_0$.

Therefore, the rate of occurrence of bright line when the scanning signal $G_0$ shown in FIG. 7 was input to the dummy scanning line $3_0$ is the one shown in (B) of FIG. 8. It was found from this result that, when the scanning signal $G_0$ is input to the dummy scanning line $3_0$, the rate of occurrence of bright line can be reduced to about a half of the rate (shown in (D) of FIG. 8) measured when any signal was not input to the dummy scanning line $3_0$.

[Embodiment 5]

The following description will discuss another embodiment of the present invention. In this embodiment, a liquid crystal display device having the same circuit structure as in Embodiment 1 is used.

In this embodiment, in the above-mentioned liquid crystal display device, any one of the scanning signals to be input to the scanning lines $3_1$, $3_2$, . . . is input as the scanning signal $G_0$ to the dummy scanning line $3_0$. In this case, like Embodiment 2, the scanning drive circuit K functions as the signal input means for inputting a signal to the dummy scanning lines $3_0$.

For example, the rate of occurrence of bright line was measured when the scanning signal $G_2$ to be input to the scanning line $3_2$ in the second row was input as the scanning signal $G_0$ to the dummy scanning line $3_0$. It was found from this result that the rate of occurrence of bright line becomes zero as shown in (A) of FIG. 8. Namely, a phenomenon in which only the topmost line appears as a bight line is completely eliminated.

[Embodiment 6]

The following description will discuss another embodiment of the present invention. The members having the same function as in Embodiment 1 above will be designated by the same code and their description will be omitted.

Figure 13:
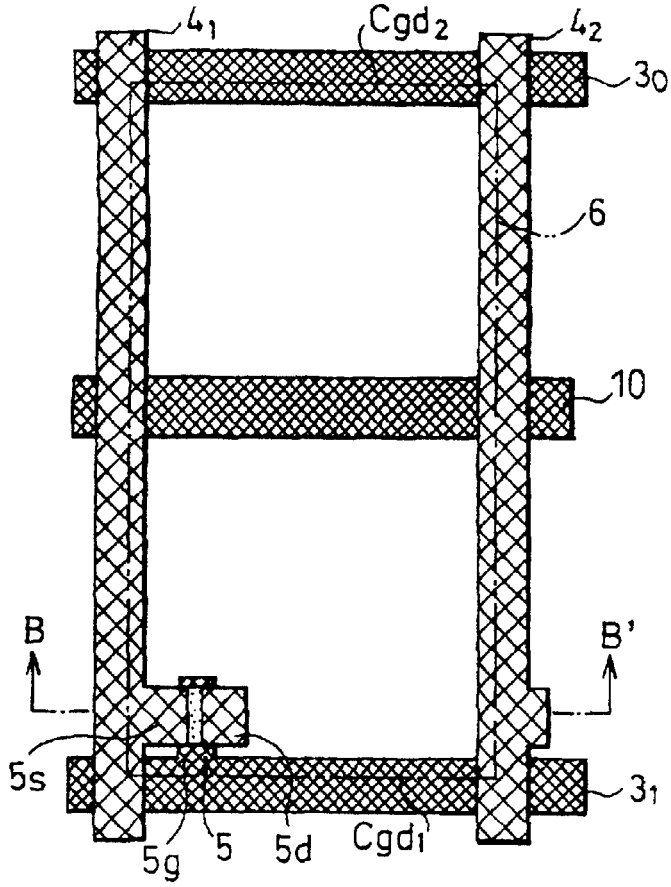
FIG. 13 is a plane view of a single pixel of a liquid crystal display device according to Embodiment 6 of the present invention.

Unlike the liquid crystal display device of Embodiment 1, in a liquid crystal display device of this embodiment, as shown in FIG. 13, the pixel electrode 6 is formed so that the pixel electrode 6 partly overlaps the dummy scanning line $3_0$, the scanning line $3_1$, the signal lines $4_1$ and $4_2$.

Figure 14:
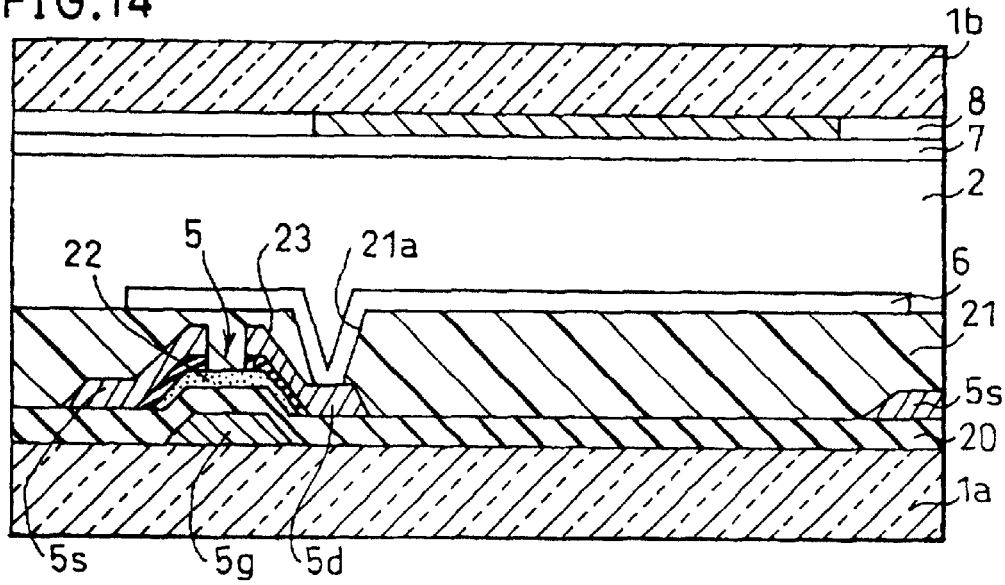
FIG. 14 is a cross sectional view of FIG. 13 cut across the B—B' line.
Figure 15:
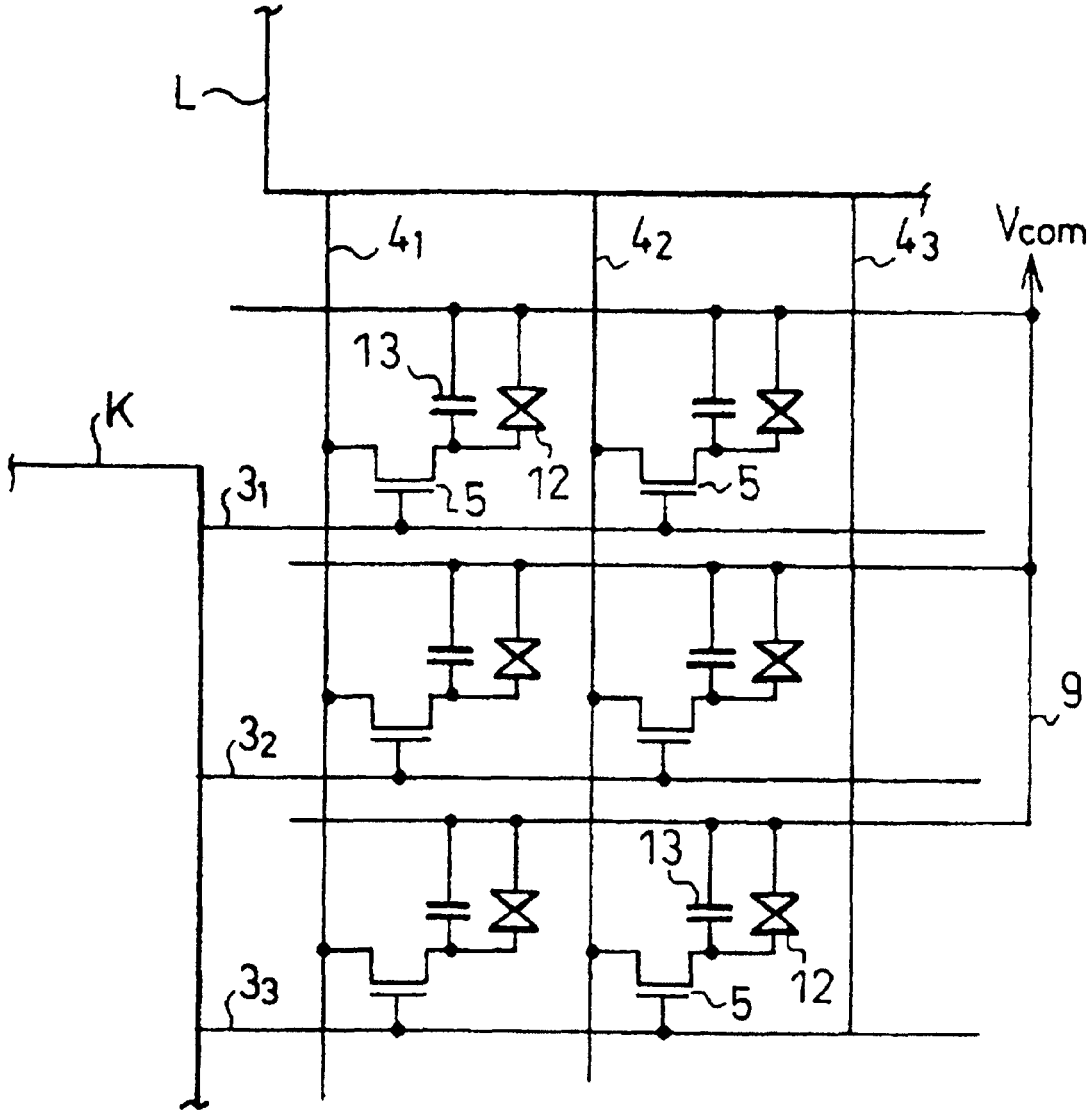
FIG. 15 is a circuit diagram showing the structure of a conventional liquid crystal display device.

For example, as illustrated in FIG. 14, an inter-layer insulating film 21 is formed by an insulating resin or the like to cover the TFT 5 on the lower glass substrate 1a, the scanning line connected to the gate electrode 5g of the TFT 5, and the signal line connected to the source electrode 5s of the TFT 5. A contact hole 21a is formed in the inter-layer insulating film 21 at a position corresponding to the drain electrode 5d of the TFT 5.

The pixel electrode 6 is formed on the inter-layer insulating film 21 so that the pixel electrode 6 is electrically connected to the drain electrode 5d of the TFT 5 through the contact hole 21a, and partly overlaps the dummy scanning line $3_0$, the scanning line $3_1$, the signal lines $4_1$ and $4_2$. Similarly, the pixel electrodes 6 connected in the vicinity of the intersections of other scanning lines and signal lines partly overlap the dummy scanning lines, the scanning lines and the signal lines.

By forming the inter-layer insulating film 21 on the dummy scanning line $3_0$, the scanning lines $3_1$, . . . and the signal lines $4_1$, $4_2$, . . . and successively forming the pixel electrodes 6 on the inter-layer insulating film 21 so that the pixel electrodes 6 overlap the respective lines, it is possible to increase the aperture ratio and reduce alignment defects of liquid crystals, resulting in improved quality.

Moreover, in the structure in which the pixel electrodes 6 overlap the respective lines, the parasitic capacitance between a pixel and adjacent scanning line is increased to a value which is about twice that of a structure having no inter-layer insulating film 21, i.e., a structure in which the pixel electrodes 6 do not overlap the respective lines (for example, the structure shown in FIG. 9), and defects, such as the phenomenon in which the topmost scanning line $\mathbf{3}_1$ appears as a bright line, tend to increase.

However, in this embodiment, the dummy scanning line $\mathbf{3}_0$ is arranged outside of the topmost scanning line, $\mathbf{3}_1$, parallel to the scanning line $\mathbf{3}_1$, and the pixel electrode 6 overlaps the dummy scanning line $\mathbf{3}_0$ with the inter-layer insulating film 21 therebetween. Therefore, even if the parasitic capacitance is increased to a value which is about twice that of the structure shown in FIG. 9, all of the pixels are geometrically symmetrical about the additional capacitance line 10. As a result, the parasitic capacitance ratio is equalized in all of the pixels, thereby certainly preventing defects, such as the occurrence of bright line due to different parasitic capacitance ratios.

Thus, in the liquid crystal display device of this embodiment, it is possible to increase the aperture ratio, restrain the alignment defects of liquid crystals, reduce the occurrence of defects such as the appearance of bright line, and achieve improved quality.

In addition, the rate of occurrence of bright line can further be reduced by inputting some signal to the dummy scanning line $\mathbf{3}_0$ of the liquid crystal display device of the above-mentioned structure. For instance, by inputting the scanning signal $G_0$ shown in FIG. 2 of Embodiment 1, it is possible to completely prevent the occurrence of bright line. Even when the scanning signal $G_0$ described in other embodiment is input, it is possible to completely prevent or reduce the occurrence of bright line.

In the above-mentioned embodiments, 1 to 6, a line of pixels corresponding to the topmost scanning line $\mathbf{3}_1$ may be hidden with a light blocking pattern, instead of providing the dummy scanning line $\mathbf{3}_0$, so as to prevent this line of pixels from affecting the display. However, in this state, if a current continues to be supplied over a long time, the appearance of bright line in the first row may gradually spread to the second row. Thus, this structure is not an appropriate measure to prevent the defects.

Therefore, in the structure where the first line of pixels is shaded from light, if the dummy scanning line $\mathbf{3}_0$ is provided like the present invention, it is possible to prevent the second line of pixels from appearing as a bright line.

Furthermore, in Embodiments 1 to 6, the dummy scanning line $\mathbf{3}_0$ is arranged outside of the topmost scanning line $\mathbf{3}_1$. However, the present invention is not limited to this structure. For instance, when the scanning of scanning signal starts from the lowest scanning line 3i, a dummy scanning line $\mathbf{3i}_{+1}$ is arranged outside of the lowest scanning line 3i.

In the liquid crystal display device of the present invention, an inter-layer insulating film covering the top of switching elements, scanning lines and signal lines is formed, and pixel electrodes are formed so that the pixel electrodes overlap the dummy scanning line and the adjacent scanning line corresponding to the pixel electrodes with the inter-layer insulating film therebetween.

Consequently, since the aperture ratio is improved and the alignment defect of liquid crystals is reduced as described above, it is possible to achieve a highly reliable liquid crystal display device.

Moreover, a drive method of the liquid crystal display device of the present invention includes the step of inputting a signal to the dummy scanning line formed outside of the outermost scanning line on either the scanning start side or the scanning end side of scanning signal.

Thus, by providing a dummy scanning line and inputting a signal to the dummy scanning line, the symmetry of the scanning line located on the outermost position on the scanning start side of scanning signal and the dummy scanning line about the additional capacitance line and the symmetry of other adjacent scanning lines about the additional capacitance line are substantially equalized, thereby ensuring higher display quality.

Additionally, the liquid crystal display devices of Embodiments 1 to 6 have a so-called Cs on Com structure in which the additional capacitance Cs between the pixel electrode 6 and the additional capacitance line 10 is formed on the common line 9. Hence, such a liquid crystal display device can be easily driven. Furthermore, in the Cs on Com structure, since the parasitic capacitance between the gate and source lines is reduced, it is possible to decrease shadowing (particularly in a lateral direction (scanning direction)). Consequently, the present invention can achieve a liquid crystal display device which is easily driven and has high display quality as well as the effect (an improvement of reliability) produced by the above-mentioned dummy scanning line.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device comprising:

a pair of substrates sandwiching liquid crystals therebetween;

a plurality of scanning lines to which scanning signals are successively applied;

a plurality of signal lines to which data signals are successively applied, said signal lines intersecting said scanning lines at right angles;

a switching element which is arranged in a vicinity of each of intersections of said scanning lines and said signal lines, and electrically connected to both of said scanning and signal lines;

a pixel electrode connected to each of said switching elements;

said scanning lines, signals lines, switching elements and pixel electrodes being formed on one of said substrates, a common electrode formed on the other of said substrates so that said common electrode faces said pixel electrode with said liquid crystals therebetween;

a common line for supplying a common signal to said common electrode;

a pixel capacitance, one of electrodes of said pixel capacitance formed by said pixel electrode being connected to said common line; and a dummy scanning line formed outside of one of said scanning lines located at an outermost position on either a scanning start side or a scanning end side of scanning signal, for producing a parasitic capacitance between said dummy scanning line and the pixel electrode connected to the scanning line located at the outermost position.

2. The liquid crystal display device according to claim 1, wherein said dummy scanning line is arranged at a pitch equal to a pitch of other adjacent scanning lines so that said pixel electrode is located between said dummy scanning line and the scanning line located at the outermost position.

3. The liquid crystal display device according to claim 1, wherein an inter-layer insulating film is formed over said switching elements, scanning lines and signal lines, and each of said pixel electrodes overlaps said dummy scanning line and adjacent scanning line corresponding to said pixel electrode with said inter-layer insulating film therebetween.

4. The liquid crystal display device according to claim 1, further comprising signal input means for inputting a signal to said dummy scanning line.

5. The liquid crystal display device according to claim 4, wherein said signal input means inputs a signal to said dummy scanning line before an output of a scanning signal to be input to the scanning line located at the outermost position on the scanning start side of scanning signal.

6. The liquid crystal display device according to claim 4, wherein said signal input means inputs a signal to said dummy scanning line after an output of a scanning signal to be input to the scanning line located at the outermost position on the scanning end side of scanning signal.

7. The liquid crystal display device according to claim 4, wherein said signal input means inputs a scanning signal generated exclusively for said dummy scanning line to said dummy scanning line.

8. The liquid crystal display device according to claim 4, wherein said signal input means inputs to said dummy scanning line a scanning signal to be input to the scanning line located at the outermost position on either the scanning start side or the scanning end side of scanning signal.

9. The liquid crystal display device according to claim 4, wherein said signal input means inputs to said dummy scanning line the common signal to be input to said common electrode.

10. The liquid crystal display device according to claim 4, wherein said signal input means inputs to said dummy scanning line a scanning signal of a level which does not turn on said switching elements formed on said substrate.

11. A method of driving a liquid crystal display device including a plurality of scanning line to which scanning signals are successively applied, a plurality of signal lines to which data signals are successively applied, a switching element which is arranged in a vicinity of each of intersections of the scanning lines and the signal lines and connected to both of the scanning and signal lines, a pixel electrode connected to each of the switching element, a pixel capacitance formed by the pixel electrode, a common electrode which is arranged to face the pixel electrode, liquid crystals placed between the pixel electrode and the common electrode, and a dummy scanning line formed outside of one of the scanning lines located at an outermost position on either a scanning start side or a scanning end side of scanning signal to produce a parasitic capacitance between the dummy scanning line and the pixel electrode connected to the scanning line located at the outermost position, said method comprising the steps of:

supplying the scanning signal and the data signal to the switching element and supplying a common signal to one of electrodes of the pixel capacitance so as to change an electric potential between the pixel electrode and the common electrode and vary a transmittance of the liquid crystals; and inputting a signal to the dummy scanning line.

12. The method of driving the liquid crystal display device according to claim 11, wherein the signal to be input to the dummy scanning line is output before an output of a scanning signal to be input to the scanning line located at the outermost position on the scanning start side of scanning signal.

13. The method of driving the liquid crystal display device according to claim 11, wherein the signal to be input to the dummy scanning line is output before an output of a scanning signal to be input to the scanning line located at the outermost position on the scanning end side of scanning signal.

14. The method of driving the liquid crystal display device according to claim 11, wherein the signal to be input to the dummy scanning line is a scanning signal generated exclusively for the dummy scanning line.

15. The method of driving the liquid crystal display device according to claim 11, wherein the signal to be input to the dummy scanning line is a scanning signal to be input to the scanning line located at the outermost position on either the scanning start side or the scanning end side of scanning signal.

16. The method of driving the liquid crystal display device according to claim 11, wherein the signal to be input to the dummy scanning line is the common signal to be applied to the common electrode.

17. The method of driving the liquid crystal display device according to claim 11, wherein the signal to be input to the dummy scanning line is a scanning signal of a level which does not turn on the switching elements.

*18. A pair of substrates sandwiching liquid crystals therebetween;*

*a plurality of scanning lines to which scanning signals are successively applied;*

*a plurality of signal lines to which data signals are successively applied, said signal lines intersecting said scanning lines at right angles;*

*a switching element which is arranged in a vicinity of each of intersections of said scanning lines and said signal lines, and electrically connected to both of said scanning and signal lines;*

*a pixel electrode connected to each of said switching elements;*

*said scanning lines, signal lines, switching elements and pixel electrodes being formed on one of said substrates,*

*a common electrode formed on the other of said substrates so that said common electrode faces said pixel electrode with said liquid crystals therebetween; a common line to which a common signal is applied;*

*a pixel capacitance, one of electrodes of said pixel capacitance being connected to said common line; and*

*a dummy scanning line formed outside of one of said scanning lines located at an outermost position on either a scanning start side or a scanning end side of scanning signal, for producing a parasitic capacitance between said dummy scanning line and the pixel electrode connected to the scanning line located at the outermost position.*

*19. The liquid crystal display device according to claim 18,*

*wherein said dummy scanning line is arranged at a pitch equal to a pitch of other adjacent scanning lines so that said pixel electrode is located between said dummy scanning line and the scanning line located at the outermost position.*

*20. The liquid crystal display device according to claim 18,*

*wherein an inter-layer insulating film is formed over said switching elements, scanning lines and signal lines, and*

*each of said pixel electrodes overlaps said dummy scanning line and adjacent scanning line corresponding to said pixel electrode with said inter-layer insulating film therebetween.*

*21. The liquid crystal display device according to claim 18, further comprising signal input means for inputting a signal to said dummy scanning line.*

*22. The liquid crystal display device according to claim 21,*

*wherein said signal input means inputs a signal to said dummy scanning line before an output of a scanning signal to be input to the scanning line located at the outermost position on the scanning start side of scanning signal.*

*23. The liquid crystal display device according to claim 21,*

*wherein said signal input means inputs a signal to said dummy scanning line after an output of a scanning signal to be input to the scanning line located at the outermost position on the scanning end side of scanning signal.*

*24. The liquid crystal display device according to claim 21,*

*wherein said signal input means inputs a scanning signal generated exclusively for said dummy scanning line to said dummy scanning line.*

*25. The liquid crystal display device according to claim 21,*

*wherein said signal input means inputs to said dummy scanning line a scanning signal to be input to the scanning line located at the outermost position on either the scanning start side or the scanning end side of scanning signal.*

*26. The liquid crystal display device according to claim 21,*

*wherein said signal input means inputs to said dummy scanning line the common signal to be input to said common electrode.*

*27. The liquid crystal display device according to claim 21,*

*wherein said signal input means inputs to said dummy scanning line a scanning signal of a level which does not turn on said switching elements formed on said substrate.*

* * * * *

UNITED STATES PATENT AND TRADEMARK OFFICE

CERTIFICATE OF CORRECTION

PATENT NO. : RE40,771 E
APPLICATION NO. : 09/773870
DATED : June 23, 2009
INVENTOR(S) : Tanaka et al.

It is certified that error appears in the above-identified patent and that said Letters Patent is hereby corrected as shown below:

Column 14, line 38, between "*A*" and "*pair*", insert -- *liquid crystal display device comprising: a* --.

Signed and Sealed this
Fifteenth Day of March, 2011

David J. Kappos

David J. Kappos
*Director of the United States Patent and Trademark Office*